US012661957B2

(12) United States Patent
Kang et al.

(10) Patent No.: US 12,661,957 B2
(45) Date of Patent: Jun. 23, 2026

(54) ROOF AIR VENT DEVICE

(71) Applicants: HYUNDAI MOTOR COMPANY, Seoul (KR); KIA CORPORATION, Seoul (KR); ITW EF&C KOREA LLC., Incheon (KR)

(72) Inventors: Su Yeon Kang, Seoul (KR); Gyeong Nam Cho, Daegu (KR); Kwang Ok Han, Seoul (KR); Dong Won Yeon, Hwaseong-si (KR); Yong Seok Park, Seoul (KR); Keong No Kim, Incheon (KR); Chun Ha Kim, Seoul (KR)

(73) Assignees: HYUNDAI MOTOR COMPANY, Seoul (KR); KIA CORPORATION, Seoul (KR); ITW EF&C KOREA LLC., Incheon (KR)

( * ) Notice: Subject to any disclaimer, the term of this patent is extended or adjusted under 35 U.S.C. 154(b) by 349 days.

(21) Appl. No.: 18/384,744

(22) Filed: Oct. 27, 2023

(65) Prior Publication Data

US 2025/0001837 A1 Jan. 2, 2025

(30) Foreign Application Priority Data

Jun. 30, 2023 (KR) ........................ 10-2023-0084863

(51) Int. Cl.
*B60H 1/34* (2006.01)
*B60H 1/24* (2006.01)
(52) U.S. Cl.
CPC ........... *B60H 1/3435* (2013.01); *B60H 1/245* (2013.01)

(58) Field of Classification Search
CPC .... B60H 1/3414; B60H 1/3435; B60H 1/245; B60H 1/262; B60H 1/00564; B60H 1/3428; B60H 2001/00235
See application file for complete search history.

(56) References Cited

U.S. PATENT DOCUMENTS

| | | |
|---|---|---|
| 2016/0075309 A1 | 3/2016 | Ooe |
| 2019/0336901 A1 | 11/2019 | Kim |

FOREIGN PATENT DOCUMENTS

| | | |
|---|---|---|
| DE | 10050168 C1 | 11/2001 |
| EP | 2426427 A2 | 3/2012 |
| EP | 2998139 B1 | 9/2018 |
| GB | 2240856 B | 5/1994 |
| JP | S6011367 Y2 | 4/1985 |
| JP | H0930248 A * | 2/1997 |

(Continued)

OTHER PUBLICATIONS

Office Action cited in the German patent application No. 10 2023 130 906.4; Jan. 22, 2026; 8 pp.

*Primary Examiner* — Allen R. B. Schult

(74) *Attorney, Agent, or Firm* — Lempia Summerfield Katz LLC

(57) ABSTRACT

A roof air vent device includes: a roof provided to cover an upper portion of a vehicle; a duct housing provided in the roof extending in a length direction or width direction of the vehicle to draw air into the duct housing; a guide member provided inside the duct housing in the extending direction of the duct housing to distribute the air drawn into the duct housing; and a rotating nozzle including a discharge unit provided to the duct housing to discharge the air drawn into the duct housing into a vehicle cabin and to change directions of air discharge by rotation of the discharge unit.

7 Claims, 7 Drawing Sheets

(56)        References Cited

FOREIGN PATENT DOCUMENTS

| JP | 2007038711 | A | | 2/2007 |
|----|-----------|---|---|--------|
| JP | 2008032261 | A | | 2/2008 |
| JP | 2010019483 | A | | 1/2010 |
| JP | 2015105026 | A | * | 6/2015 |
| JP | 5881989 | B2 | | 3/2016 |
| JP | 2016196276 | A | | 11/2016 |
| JP | 2016203669 | A | | 12/2016 |
| JP | 6576105 | B2 | | 9/2019 |
| JP | 6741531 | B2 | | 8/2020 |
| JP | 2020138623 | A | | 9/2020 |
| JP | 2020142602 | A | | 9/2020 |
| JP | 6816474 | B2 | | 1/2021 |
| JP | 6974125 | B2 | | 12/2021 |
| KR | 100802837 | B1 | | 2/2008 |
| KR | 20170118998 | A | | 10/2017 |
| KR | 101921274 | B1 | | 2/2019 |

* cited by examiner

210 airflow direction

$\underline{\hspace{2cm}}$ 14.32
$\underline{\hspace{2cm}}$ 7.16
$\underline{\hspace{2cm}}$ 0.00

ROOF AIR VENT DEVICE

CROSS REFERENCE TO RELATED APPLICATION

The present application claims priority to Korean Patent Application No. 10-2023-0084863, filed Jun. 30, 2023, the entire contents of which are incorporated herein for all purposes by this reference.

BACKGROUND

Field of the Disclosure

The present disclosure relates to a roof air vent device provided in the roof of a vehicle.

Description of the Related Art

With the gradual advancement of autonomous driving technology for vehicles, the function of vehicles as communication spaces as well as the transportation function have been strengthened. The traditional design of vehicles as a means of transportation has a standardized structure, with the engine compartment located at the front. As electric vehicles equipped with electric motors and batteries replacing internal combustion engines are gaining attention, various designs are being attempted, departing from the standardized structures of internal combustion engine vehicles.

As autonomous driving technology and electric vehicles are becoming more commonplace, attempts are being made to drastically change the interior design of vehicles. Automakers are conducting research on futuristic vehicles, showcasing diverse interior designs and concepts.

On the other hand, design changes in vehicles necessitate structural changes in the air conditioning system, especially the ducts or air vents, for heating and cooling the vehicle cabin space. There is a need to develop a roof air vent structure that allows air discharge through the air vent toward the passengers or in a direction away from the passengers toward the vehicle roof like a fan, regardless of the size of the vehicle cabin space. There is also a need to develop a roof air vent structure that allows even distribution of air throughout the entire vehicle cabin.

The subject matter described above as background technology is intended to provide a better understanding of the background of the present disclosure. The above subject matter should not be considered as acknowledging that the present disclosure pertains to the prior art already known to those of ordinary skill in the art.

SUMMARY

Objects of the present disclosure are to provide a roof air vent device that allows even air discharge from the vehicle roof toward the vehicle cabin, adjustment of the direction of air discharge, and gentle air discharge into the vehicle cabin according to the passengers' preference or situations.

According to the present disclosure, a roof air vent device includes a roof provided to cover an upper portion of a vehicle and a duct housing provided in the roof in the length direction or width direction of the vehicle to draw air into the duct housing. The device also includes a guide member provided inside the duct housing in the extending direction of the duct housing to distribute the air drawn into the duct housing. The device also includes a rotating nozzle including a discharge unit configured to discharge the air drawn into the duct housing into the vehicle cabin and to change directions of air discharge by rotating the discharge unit.

A plurality of the discharge units may be provided and a rotary dial for rotating the discharge units may be provided between the plurality of discharge units.

A first outlet for discharging the air drawn into the duct housing may be formed, i.e., disposed, positioned, or provided in the discharge unit.

The rotating nozzle may be provided outside the duct housing. An outer panel may cover the rotating nozzle and may be coupled to the duct housing may be outside the duct housing.

A second outlet for discharging the air drawn into the duct housing may be formed in the outer panel.

The discharge unit may discharge air through the second outlet by rotating the rotating nozzle.

Air may first pass through the first outlet and then pass through the second outlet to be discharged.

An inlet for drawing in the air may be formed on a side of the duct housing.

A plurality of guide flow paths may extend in the length direction of the vehicle, may divide the air drawn into the duct housing, and may be formed in the guide member.

The inlet for drawing in the air may be formed on the side of the duct housing. A plurality of first outlets for discharging the air drawn into the duct housing may be disposed in the discharge unit. The cross-sectional area of the inlet may be smaller than the cross-sectional area of the plurality of first outlets formed in the discharge unit.

The air discharge area may be double the air inlet area or more.

According to the present disclosure, the roof air vent device allows even air discharge from the vehicle roof toward the vehicle cabin, adjustment of the direction of air discharge, and gentle air discharge.

BRIEF DESCRIPTION OF THE DRAWINGS

FIG. 2 is a view illustrating a guide member of the roof air vent device of FIG. 1.

FIG. 4 is a view illustrating a cross-section taken along the line A-A' in FIG. 3 and air discharge directions according to rotation of a discharge unit.

DETAILED DESCRIPTION

Figure 1:
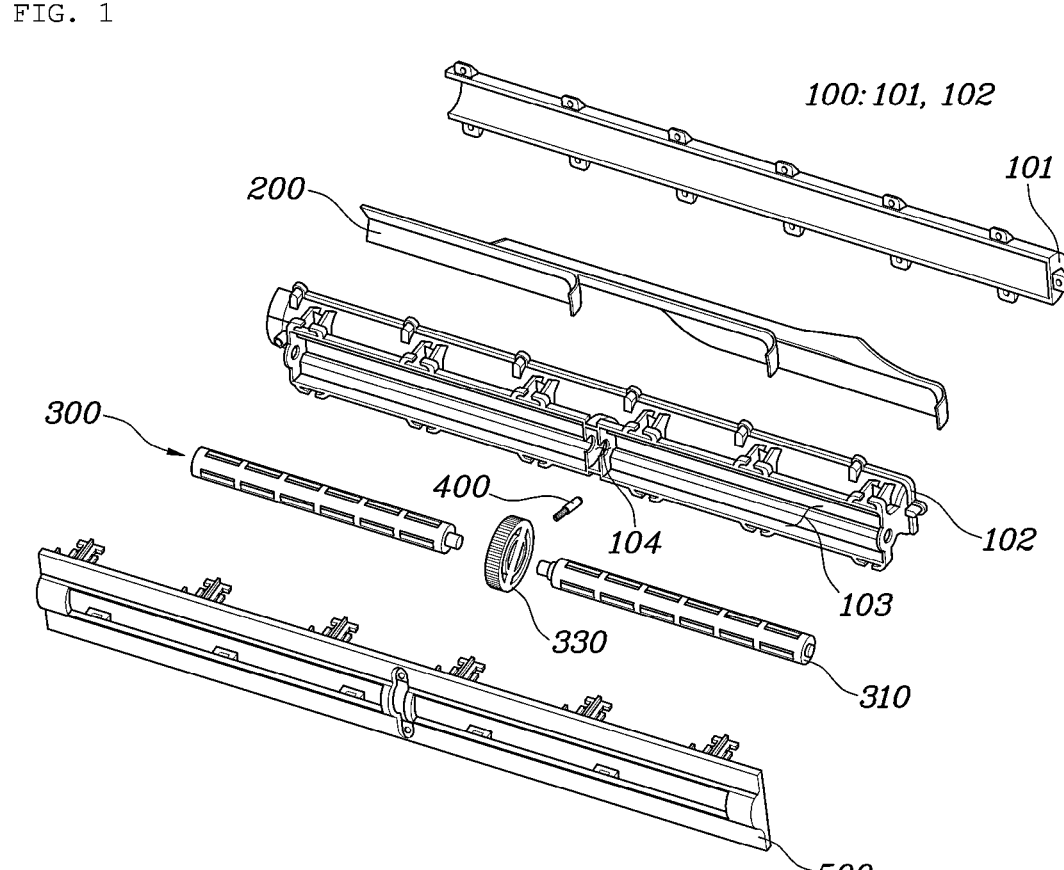
FIG. 1 is an exploded view of a roof air vent device according to an embodiment of the present disclosure.

The embodiments disclosed herein are described in detail with reference to the accompanying drawings. However, the same or similar components are given the same reference numerals regardless of the drawing, and repetitive descriptions regarding these components have been omitted.

Where it has been determined that the specific description of the related and already known technology may obscure the essence of the embodiments disclosed herein, the specific description have been omitted. Further, it is to be understood that the accompanying drawings are only intended to facilitate understanding of the embodiments disclosed herein and are not intended to limit the technical ideas disclosed herein. Thus, the technical ideas are not limited to the accompanying drawings and include all modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

Singular expressions include plural expressions unless the context explicitly indicates otherwise. When a component, device, element, or the like of the present disclosure is described as having a purpose or performing an operation, function, or the like, the component, device, or element should be considered herein as being "configured to" meet that purpose or to perform that operation or function.

In the present specification, terms such as "comprise", "include", or "have" and variations thereof are intended to indicate the presence of implemented features, numbers, steps, manipulations, components, parts, or combinations thereof described in the specification. Such terms are not to be understood to preclude the presence or additional possibilities of one or more of other features, numbers, steps, manipulations, components, parts, or combinations thereof.

It is to be understood that, when a component is referred to as being "connected" or "coupled" to another component, the component may be directly connected or coupled to the other component, but other components may be interposed therebetween. In contrast, it is to be understood that, when a component is referred to as being "directly connected" or "directly coupled" to another component, no other component is interposed therebetween.

Figure 2:
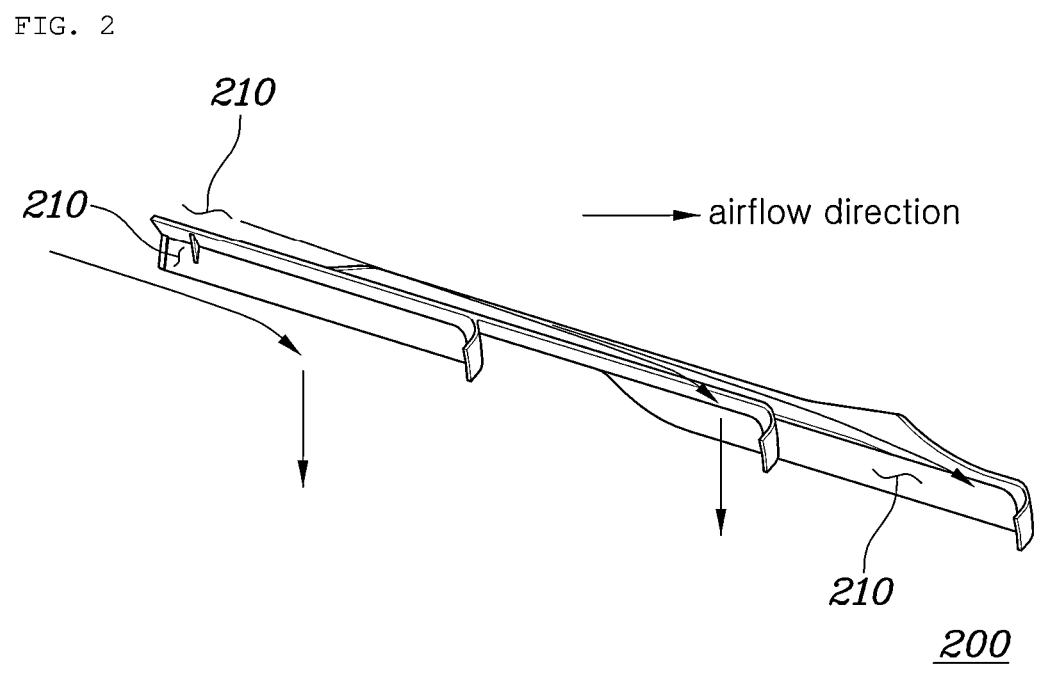
Figure 3:
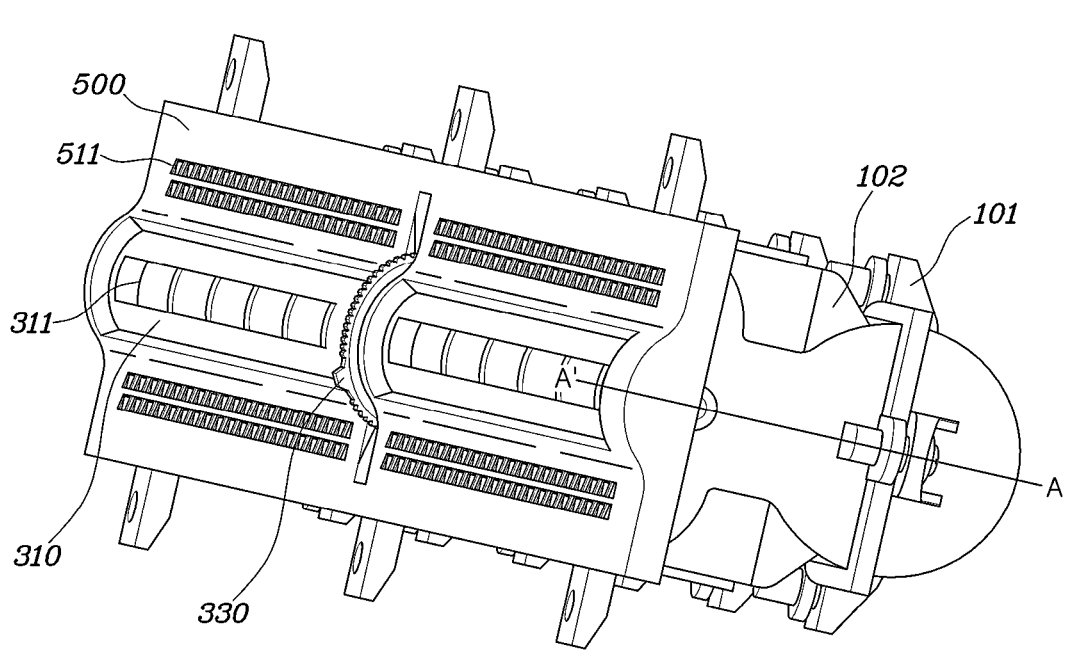
FIG. 3 is a perspective view of a roof air vent device according to an embodiment of the present disclosure.
Figure 4:
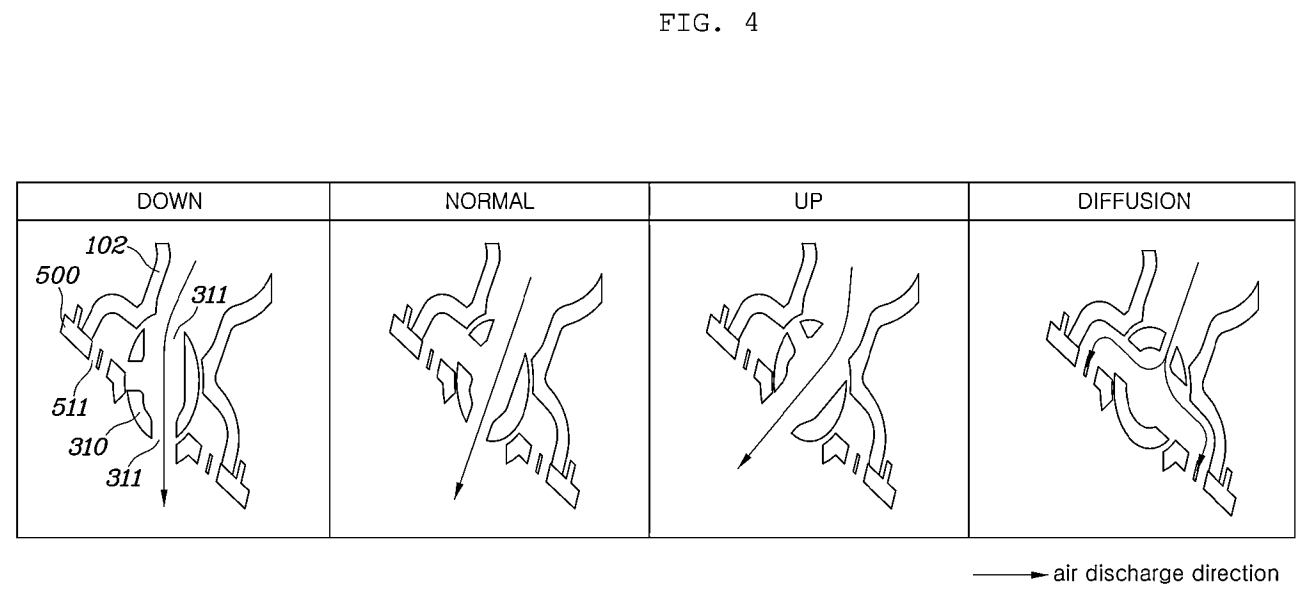
Figure 5:
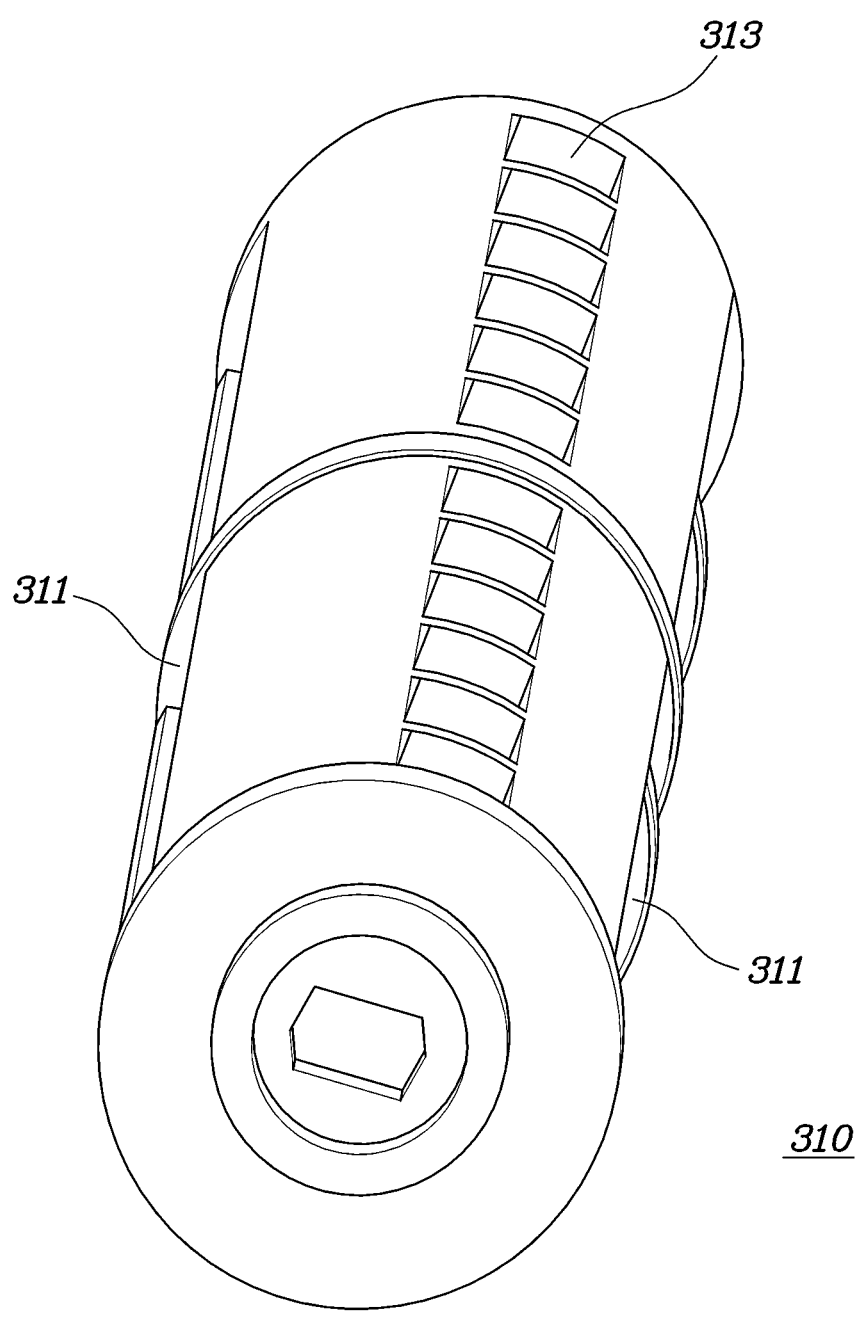
FIG. 5 is a view illustrating a discharge unit of the roof air vent device of FIGS. 3 and 4.
Figure 6:
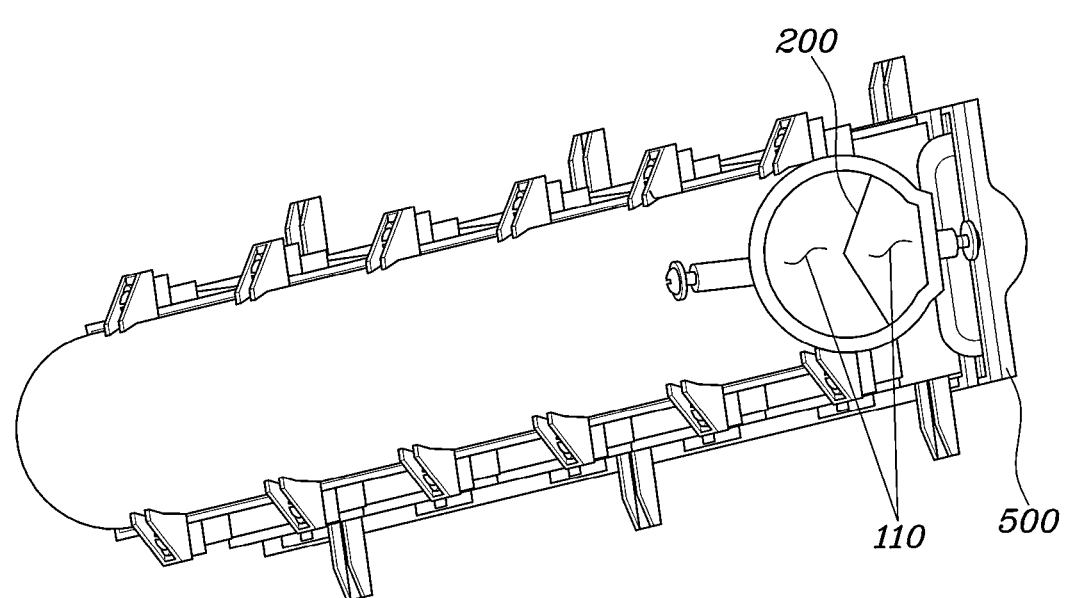
FIG. 6 is a perspective view of a roof air vent device according to an embodiment of the present disclosure.
Figure 7:
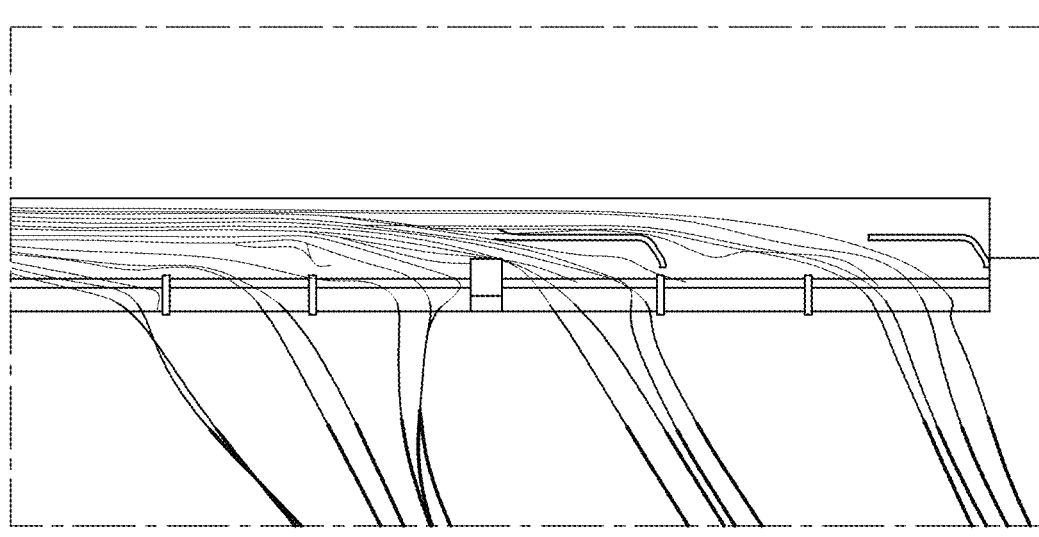
FIG. 7 is a view illustrating experiment results on airflow through a roof air vent device according to an embodiment of the present disclosure.

FIG. 1 is an exploded view of a roof air vent device according to an embodiment of the present disclosure. FIG. 2 is a view illustrating a guide member for a roof air vent device. FIG. 3 is a perspective view of a roof air vent device according to an embodiment of the present disclosure. FIG. 4 is a view illustrating a cross-section taken along line A-A' in FIG. 3 and air discharge directions according to rotation of a discharge unit. FIG. 5 is a view illustrating a discharge unit. FIG. 6 is a perspective view of a roof air vent device according to an embodiment of the present disclosure. FIG. 7 is a view illustrating experiment results on airflow through a roof air vent device according to an embodiment of the present disclosure.

According to an embodiment of the present disclosure, a roof air vent device is included in a roof or includes a roof provided to cover an upper portion of a vehicle. The device also includes a duct housing 100 provided in the roof in the length direction or width direction of the vehicle to draw air thereinto. The device also includes a guide member 200 provided inside the duct housing 100 in the extending direction of the duct housing 100 to distribute the air drawn into the duct housing 100. The device also includes a rotating nozzle 300 having a discharge unit 310 provided with the duct housing 100 to discharge the air drawn into the duct housing 100 and into the vehicle cabin and configured to change directions of air discharge by rotating the discharge unit 310.

According to the present disclosure, the roof air vent device receives conditioned air from a heating ventilation air conditioning (HVAC) system provided inside a vehicle and discharges the conditioned air into a vehicle cabin. The HVAC conditions the air according to the needs of passengers or according to the set options. For example, air can be cooled for cooling, air can be heated for heating, and air can be cooled and heated to produce dry air when dehumidification is needed.

The HVAC system can cool, heat, and dehumidify air using a refrigerant or the like. The conditioned air is delivered to the roof air vent device of the present disclosure using a blower, a roof duct, a rear duct, and the like inside the vehicle. The delivered air is discharged into the vehicle cabin through the roof air vent device.

The air delivered to the roof air vent device flows into the duct housing 100. The duct housing 100 is provided in the roof covering the upper portion of the vehicle to ensure air discharge from the roof toward the vehicle cabin. The duct housing 100 may be provided at one end of the roof, may be provided in the width direction of the vehicle, may be provided in the length direction of the vehicle, or may be provided in both the width direction and length direction of the vehicle.

The duct housing 100 may be formed by coupling an upper duct 102 and a lower duct 101. Air may be drawn in through one end of the duct housing 100 and the air drawn into the duct housing 100 flows in the length direction of the duct housing 100.

The guide member 200 is configured to evenly distribute the air drawn into the duct housing 100 and may be provided inside the duct housing 100. The guide member 200 extends in the length direction of the duct housing 100 and is intended to evenly distribute the air flowing in the length direction from one end of the duct housing 100.

The guide member 200 may have a smooth curve in a streamlined or spiral shape to create a smooth airflow and may include a flow path for air to flow therethrough.

The rotating nozzle 300 may include the discharge unit 310 and is provided with the duct housing 100. A discharge unit coupler 103, to which the discharge unit 310 is coupled, is formed outside the duct housing 100 and the discharge unit 310 is seated to be coupled thereto. A hole for communication between the upper duct 102 and the discharge unit 310 may be formed, i.e., disposed, in the upper duct 102, in which the discharge unit coupler 103 is formed, to deliver air to the discharge unit 310.

As is described in detail below, the discharge unit 310 may change the direction or directions of air discharge in various ways depending on its rotation, i.e., its rotated position. The discharge unit 310 may be manually rotated by passengers or may be controlled using a controller by passengers.

With this roof air vent device, air may be evenly discharged from the vehicle roof toward the vehicle cabin and the direction of air discharge may be adjusted.

On the other hand, a plurality of discharge units 310 may be provided. A rotary dial 330 may be coupled to the discharge units 310 and configured to rotate the discharge units 310 and may be provided between the plurality of discharge units 310. The rotary dial coupler 104 to which the rotary dial 330 is coupled is formed outside the duct housing 100, and the rotary dial 330 is seated to be coupled thereto. A ball spring 400 may be provided between the rotary dial 330 and the rotary dial coupler 104. The ball spring 400 ensures that the rotary dial rotates only when a certain external force is applied. In other words, the passenger may rotate the rotary dial 330 when the ball spring 400 is in a compressed state while pressing the rotary dial 330 to rotate the rotary dial 330. Once the rotation of the rotary dial 330 is completed, the ball spring 400 may rebound and support the rotary dial 330 such that the rotary dial 330 cannot rotate.

Thus, the position of the rotary dial 330 may be fixed so that air is discharged only in the direction set by the passenger.

As in one embodiment of the present disclosure, a pair of discharge units 310 may be provided. The rotary dial 330 may be provided between the pair of discharge units 310.

When the passenger rotates the rotary dial 330, the discharge units 310 also rotate to change the directions of air discharge.

Specifically, changing the direction of air discharge by rotating the discharge unit 310 is described below.

The first outlet 311 for discharging the air drawn into the duct housing 100 may be formed, i.e., disposed, in the discharge unit 310. A plurality of first outlets 311 may be formed, i.e., disposed, at a plurality of points in the discharge unit 310. The first outlets 311 are arranged in the extending direction of the discharge unit 310. The first outlets 311 may have uniform cross-sectional areas in the extending direction of the discharge unit 310 and the direction in which air is guided may also change by rotating the discharge units 310 so that air may be discharged in a certain direction.

FIG. 5 shows that the first outlets 311 may be arranged facing each other at a plurality of points in the discharge unit. In addition, communication openings 313 for communicating with the first outlets 311 may be formed at a plurality of points in the discharge unit 310.

It can be confirmed in FIG. 4 that the direction of air discharge changes by rotating the discharge unit 310. By rotating the discharge unit 310, the air may be discharged to the underside of the vehicle roof (DOWN), directly discharged to the passenger (NORMAL), or discharged toward the roof (UP). These three modes are just examples and the direction of air discharge can be finely adjusted by fine-tuning the rotation of the discharge unit 310, such as to directions between the three above-noted directions.

On the other hand, according to the present disclosure, the roof air vent device can also implement a diffusion mode that allows gentle air discharge. In other words, cabin air conditioning in which the passenger can hardly perceive the air discharge may be performed by discharging air through a considerable number of small outlets.

The diffusion mode may be implemented by further providing an outer panel 500 coupled to the outer side of the duct housing 100. Specifically, the outer panel 500 covers the rotating nozzle 300 outside the duct housing 100 and is coupled to the duct housing.

A plurality of finely divided second outlets 511 is formed in the outer panel 500. The conditioned air is discharged into the vehicle cabin through the second outlets 511 when the diffusion mode is implemented.

In other words, FIG. 4 shows that, when the diffusion mode is implemented, the air drawn into the duct housing 100 is delivered to the first outlet 311 through the communication opening 313, passes through the first outlet 311, and then passes through the second outlet 511 to be discharged into the vehicle cabin. The second outlet 511 has a very small area and the volume of the air discharged therethrough is correspondingly small such that passengers hardly perceive the air being discharged into the vehicle cabin.

As described above, the roof air vent device allows even air discharge from the vehicle roof toward the vehicle cabin. The device also allows adjustment of the direction of air discharge. The device further allows gentle air discharge so that the device is suited for an upscale strategy of luxury vehicles.

On the other hand, an inlet 110 for drawing in the air may be formed on a side of the duct housing 100. The inlet 110 is connected to an HVAC system and supplies conditioned air from the HVAC system into the duct housing 100. While an open inlet 110 is formed on one side of the duct housing 100, the other end is closed. Therefore, all the air drawn into the duct housing 100 is discharged into the vehicle cabin through the duct housing 100.

Specifically, the air drawn into the duct housing 100 through the inlet 110 is divided and guided by the guide member 200 that is provided inside the duct housing 100 and extending in the length direction of the vehicle. In other words, FIGS. 2, 6, and 7 show that a plurality of guide flow paths 210 divide the air drawn into the duct housing 100 and is formed, i.e., disposed, in the guide member 200. Thus, the air can be evenly distributed in the length direction of the duct housing 100.

The conditioned air can be evenly distributed in all directions of the vehicle using the guide member 200.

Further, it may be advantageous that the cross-sectional area of the single inlet 110 is smaller than the cross-sectional area of the plurality of first outlets 311. It may also be advantageous that the combined cross-sectional area of the plurality of first outlets 311 is at least double the cross-sectional area of the inlet 110. When the cross-sectional area of the inlet 110 is close to the cross-sectional area of the outlet, the pressure of the incoming air decreases to cause lopsidedly more air to be discharged through the discharge unit located close to the inlet 110. Thus, the cross-sectional areas of the inlet 110 and the outlet may differ by a factor of two or more in one example.

Specific embodiments of the present disclosure have been illustrated and described but should be apparent to those of ordinary skill in the art that various modifications and amendments are possible within the scope of the technical spirit of the present disclosure and it is natural that such modifications and amendments belong to the accompanying claims.

DESCRIPTION OF REFERENCE NUMERALS

100: duct housing
101: lower duct
102: upper duct
103: discharge unit coupler
104: rotary dial coupler
200: guide member
210: guide flow path
300: rotating nozzle
310: discharge unit
311: first outlet
313: communication opening
330: rotary dial
400: ball spring
500: outer panel
511: second outlet

What is claimed is:

1. A roof air vent device comprising:
a roof provided to cover an upper portion of a vehicle;
a duct housing provided in the roof and extending in an extending direction including a length direction or a width direction of the vehicle to draw air into the duct housing;
a guide member provided inside the duct housing in the extending direction of the duct housing to distribute the air drawn into the duct housing;
a rotating nozzle including a discharge unit configured to discharge the air drawn into the duct housing into a vehicle cabin and to change a direction of air discharge by rotation of the discharge unit; and an outer panel that covers the rotating nozzle, is coupled to the duct housing, and is disposed outside the duct housing, wherein a first outlet configured to discharge the air drawn into the duct housing is disposed in the discharge unit, wherein a second outlet configured to discharge the air drawn into the duct housing is disposed in the outer panel, wherein the discharge unit discharges the air through the second outlet by rotation of the rotating nozzle, wherein, by rotation of the discharge unit, the air is selectively discharged into the vehicle cabin through the first outlet or through the second outlet, and wherein a discharge range of the air discharged through the second outlet is wider than a discharge range of the air discharged through the first outlet.

2. The roof air vent device of claim 1, wherein a plurality of the discharge units is provided, and wherein a rotary dial for rotating the plurality of discharge units is provided between the plurality of discharge units.

3. The roof air vent device of claim 1, wherein the air first passes through the first outlet and then passes through the second outlet to be discharged.

4. The roof air vent device of claim 1, wherein an inlet for drawing air into the duct housing is disposed on a side of the duct housing.

5. The roof air vent device of claim 1, wherein a plurality of guide flow paths extends in the length direction of the vehicle, divides the air drawn into the duct housing, and is disposed in the guide member.

6. The roof air vent device of claim 1, wherein an inlet for drawing the air into the duct housing is disposed on a side of the duct housing, wherein a plurality of first outlets for discharging the air drawn into the duct housing is disposed in the discharge unit, and wherein a cross-sectional area of the inlet is smaller than a cross-sectional area of the plurality of first outlets formed in the discharge unit.

7. The roof air vent device of claim 6, wherein an air discharge area is double an air inlet area or more.

* * * * *